Feb. 22, 1949.   S. BATTILANI   2,462,349
VACUUM TYPE COFFEE MAKING UTENSIL
Filed Nov. 2, 1945
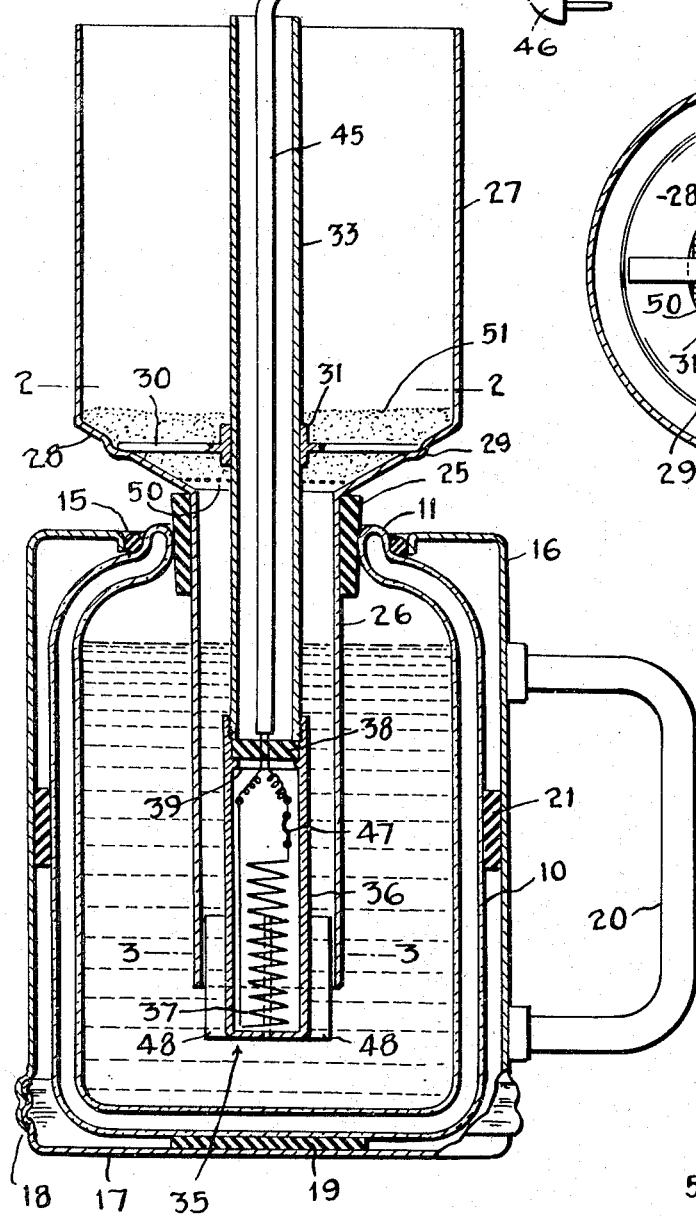
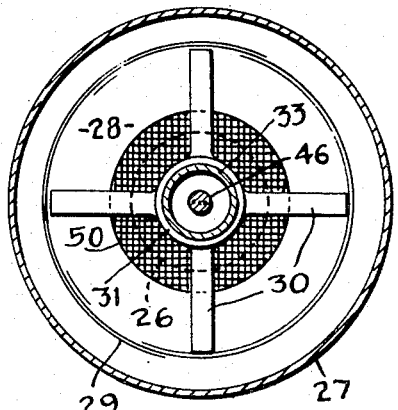
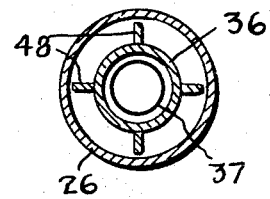
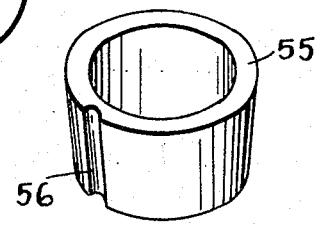
INVENTOR
STEFANO BATTILANI
BY
ATTORNEY Patented Feb. 22, 1949

2,462,349

UNITED STATES PATENT OFFICE 2,462,349

VACUUM TYPE COFFEE-MAKING UTENSIL

Stefano Battilani, New York, N. Y.

Application November 2, 1945, Serial No. 626,397

2 Claims. (Cl. 99—292)

The invention relates to a vacuum type coffee making utensil.

One of the objects of the invention is to provide a utensil of extreme simplicity and practicability which will make excellent coffee.

A further object is to provide a coffee making utensil which may be readily taken apart with the greatest of ease and facility for cleaning purposes.

Another object is to provide a container for the coffee which will keep the coffee warm for a considerable time after it has been made.

Still another object is to provide a self-contained heating element for electrically heating the water in its container and from which the coffee is to be made.

An additional object is to provide a simple means by which the coffee may be made should electrical current not be available.

Other objects and advantages will become apparent as the specification proceeds. Referring to the drawings forming a part thereof and in which one form of the invention is illustrated:

Fig. 1 is a longitudinal sectional view, parts being in elevation;

Fig. 2 is a detail cross sectional view taken on line 2—2 of Fig. 1;

Fig. 3 is a detail cross sectional view taken on line 3—3 of Fig. 1; and

Fig. 4 is a perspective view of a type of gasket that might be used should the electrical current not be available.

Referring again to the drawings the reference numeral 10 designates a container which is preferably of the Thermos type, that is being double walled and having a vacuum between the walls. Other heat insulating means than that of the Thermos type are not precluded. The Thermos container 10 has a neck portion 11.

A gasket 15, preferably formed of insulating material, is interposed between the outside of the neck portion 11 of the Thermos receptacle and the top of a shell 16. The shell 16 may be made of a metallic material and an air space is preferably left between the shell and the heat insulated receptacle. The shell 16 has a bottom 17 which is secured to the body portion either frictionally or by screw threads 18. Interposed between the bottom portion 17 and the bottom of the Thermos receptacle is a pad 19, preferably made of heat insulating material. It will be apparent when the bottom portion 17 is unscrewed the body portion of the shell may be readily removed for replacement or cleaning purposes. The body portion of the shell is provided with a conventional handle 20 which may be made of heat insulating material or secured to the body portion by pads of heat insulating material. An additional positioning ring 21 may be provided.

A gasket 25, preferably formed of heat insulating material, is interposed between the inner side of the neck 11 of the Thermos receptacle and a tubular member 26 which forms the neck of what might be termed a funnel. The body portion 27 of the funnel is joined to the neck portion 26 by the annular sloping wall 28. An annular head 29 is formed in the sloping wall 28.

A plurality of arms 30 are accommodated in the annular bead 29. The inner ends of the arms 30 are connected to or formed integral with a ring 31 which is secured to a tubular member 33 for supporting said tubular member. The tubular member 33 extends into the neck 26 and is supported centrally in relation therewith. Obviously numerous other means could readily be devised for supporting the tubular member 33 in proper relation to the neck 26.

Threaded or otherwise secured to the lower end of the tubular member 33 is the heating element 35. The heating element is electrical and comprises a cup 36 in which is suitably mounted the heating coil 37. The leads of the heating coil 37 pass through a disc 38 formed of insulating material and removably mounted on a bead 39 formed in the upper part of the cup 36. In addition to acting as an insulating member the disc 38 functions to prevent the admission of any moisture into the compartment housing the heating coil.

The leads from the heating coil are entered into a cable 45 which passes upwardly through the tubular member 33 and thence to a conventional disconnect plug 46. A fuse 47 is set into one of the leads from the heating coil 37 below the removable disc 38. This fuse could be interposed in either one of the lines at any point between the heating coil and the disconnect plug.

The cup 36 has fins 48 for all or part of its length to increase the efficiency and radiation of the heating element. Obviously other ways of increasing the radiation might easily be devised.

Mounted just above the depending neck 26 and carried by the tubular member 33 is a filter member 50 upon which the ground coffee 51 is placed. This filter member might be in the nature of a finely perforated plate or a screen made of metal, fabric or any suitable material.

Obviously while the device is spoken of as a coffee making utensil it could readily be used for making tea. In the operation the funnel member and its depending neck carrying the heating element is removed from the Thermos receptacle and the required amount of water is placed in the receptacle as illustrated in Fig. 1. The funnel member is then replaced and the disconnect plug 46 is inserted in its socket. As the water heats up and steam is generated, it will be forced upwardly past the heating element and between the neck 26 and tubular member 33, through the ground coffee and into the container 27. After all the water except that between the lower mouth of the neck and the bottom of the Thermos receptacle has been forced into the container 27 the disconnect plug is withdrawn from its socket. The condensing steam then forms a vacuum in the Thermos receptacle and the pressure developed thereby naturally brings the fluid in the upper container 27 back through the ground coffee and into the Thermos receptacle. The funnel member is then removed and the coffee is ready to serve. If it is desired to save the coffee or part of it a suitable closure is applied in the neck of the Thermos container and the coffee will be kept hot for a considerable length of time.

Leaving a certain amount of water between the lower mouth of the depending neck 26 and the bottom of the Thermos receptacle acts as a safety feature. Should one inadvertently neglect to pull the disconnect plug after the required amount of water has passed in the upper container there will be sufficient water left in the Thermos receptacle to boil for a long time before causing any damage to the heating element.

Another important element of the invention is the provision of the supplementary gasket illustrated in Fig. 4. This gasket 55 is made of the same material as the gasket 25 and is interchangeable therewith and is provided with one or more longitudinally extending grooves 56 in its outer wall. When placed in the position of Fig. 1 the groove 56 functions as a vent opening. The gasket 55 might be provided with vent means of any description instead of the groove or grooves 56. Should the electric current not be available or for some reason be shut off the gasket 55 is substituted for the gasket 25. Boiling water is then poured into the receptacle 27 over the coffee or tea therein and the vent opening 56 permits the escape of air from the vacuum receptacle as the coffee or tea is entering therein.

Changes might be made in the construction or positioning of the heating unit 35 without departing from the principle of the invention. The body portion 27 of the funnel member might also be double walled and heat insulated if desired.

Changes in details of construction such as would occur to one skilled in the art are to be considered as coming within the spirit of the invention as set forth in the appended claims.

I claim:

1. In a vacuum coffee maker having a thermally insulated lower receptacle with a mouth at its upper end, an upper, open-top receptacle with a downwardly extending cylindrical neck that projects into the lower receptacle and terminates at some distance above the bottom of said lower receptacle, and an annular gasket surrounding the upper end of the neck and fitting within said mouth to seal the space between the neck and mouth, the improvement that comprises a tubular element extending downward through the upper receptacle and into the neck, supporting means extending from the sides of the tubular element and contacting with the bottom of the upper receptacle to support the tubular element in a predetermined relation with respect to the upper receptacle, an annular porous support for ground coffee, said porous support fitting closely around the tubular element below its supporting means and contacting with the bottom of the upper receptacle near the top of the neck, an imperforate cup threaded to the lower end of the tubular element and sealing the tubular element against the entrance of water or steam from the lower receptacle, said cup being of such length that it extends below the bottom of the neck, an electric heating coil housed within the cup, conductors extending from the heating coil upward through the tubular element and out through the top of said tubular element for connection with a source of power, and heat distributing fins extending outwardly from said cup for centering the cup and tubular element at the lower end of the neck.

2. In a vacuum coffee maker having a lower receptacle with a mouth at its upper end, an upper, open-top receptacle with a downwardly extending cylindrical neck that projects into the lower receptacle and terminates at some distance above the bottom of said lower receptacle, at least one of the receptacles being thermally insulated, and an annular gasket surrounding the upper end of the neck and fitting within said mouth to seal the space between the neck and mouth, the improvement that comprises a tubular element extending downward through the upper receptacle and into the neck, supporting means extending from the sides of the tubular element and contacting with the bottom of the upper receptacle to support the tubular element in a predetermined relation with respect to the upper receptacle, an annular porous support for ground coffee, said porous support fitting closely around the tubular element below its supporting means and contacting with the bottom of the upper receptacle near the top of the neck, an imperforate cup threaded to the lower end of the tubular element and sealing the tubular element against the entrance of water or steam from the lower receptacle, an electric heating coil housed within the cup, and conductors extending from the heating coil upward through the tubular element and out through the top of said tubular element for connection with a source of power.

STEFANO BATTILANI.

REFERENCES CITED

The following references are of record in the file of this patent:

UNITED STATES PATENTS

| Number | Name | Date |
|---|---|---|
| 1,472,704 | Ward | Oct. 30, 1923 |
| 1,494,691 | Loggie et al. | May 20, 1924 |
| 1,946,247 | Wales | Feb. 6, 1934 |
| 1,995,081 | Sommers | Mar. 19, 1935 |
| 2,133,178 | Sieling | Oct. 11, 1938 |
| 2,227,540 | Fry | Jan. 7, 1941 |
| 2,321,411 | Morse | June 8, 1943 |
| 2,345,264 | Jepson | Mar. 28, 1944 |
| 2,388,335 | McCullough | Nov. 6, 1945 |

FOREIGN PATENTS

| Number | Country | Date |
|---|---|---|
| 162,891 | Switzerland | Sept. 16, 1933 |
| 438,944 | Great Britain | Nov. 26, 1935 |